United States Patent [19]
Burdick et al.

[11] 3,796,279
[45] Mar. 12, 1974

[54] TRANSPORTER WITH BUILT-IN DISTRIBUTION AND DAMPING

[75] Inventors: Robert E. Burdick; Baxter K. Wolf, both of Santa Barbara, Calif.

[73] Assignee: Rolair Systems, Inc., Santa Barbara, Calif.

[22] Filed: Oct. 18, 1972

[21] Appl. No.: 298,464

[52] U.S. Cl. .............................. 180/124, 180/125
[51] Int. Cl. ............................................. B60v 1/06
[58] Field of Search .......... 180/124, 125, 126, 127, 180/128, 116, 129, 130

[56] References Cited
UNITED STATES PATENTS

| | | |
|---|---|---|
| 3,276,530 | 10/1966 | Borneman.......................... 180/124 |
| 3,552,519 | 1/1971 | Wren................................. 180/124 |
| 3,458,007 | 7/1969 | Todd................................. 180/124 X |
| 3,650,218 | 3/1972 | Losey................................ 180/124 |
| 3,466,010 | 9/1969 | Jung................................. 180/125 X |

Primary Examiner—Kenneth H. Betts
Assistant Examiner—John P. Silverstrim
Attorney, Agent, or Firm—Harris, Kern, Wallen & Tinsley

[57] ABSTRACT

An air cushion transporter with a platform and a plurality of replaceable air bearings. A platform formed of welded rectangular steel tubing providing built-in air distribution and air damping with the only piping being that used for making the connection to the external air supply. A low profile platform with no exposed or exterior piping.

5 Claims, 5 Drawing Figures

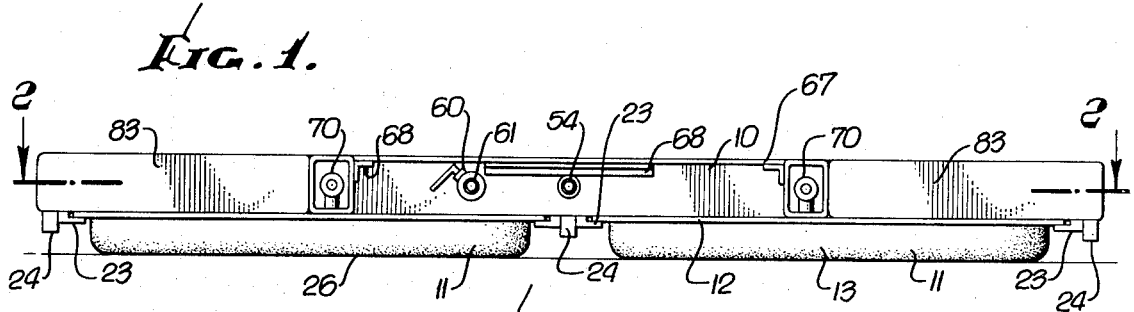
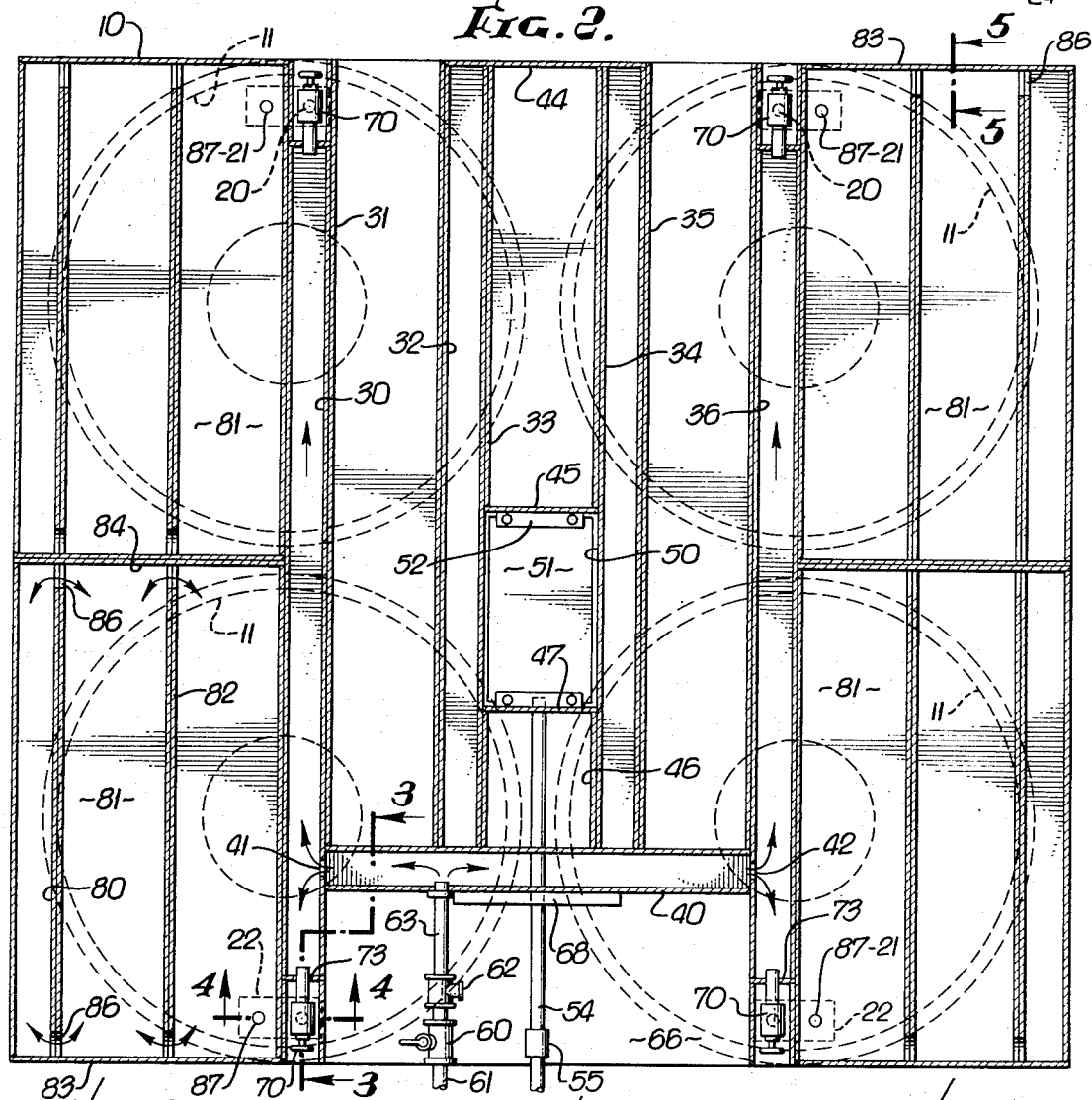
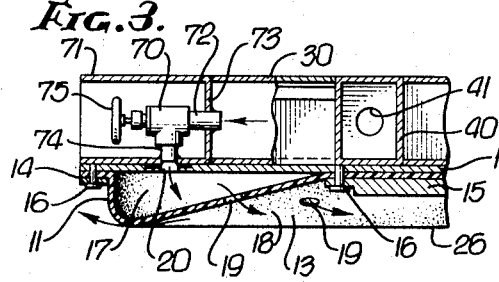
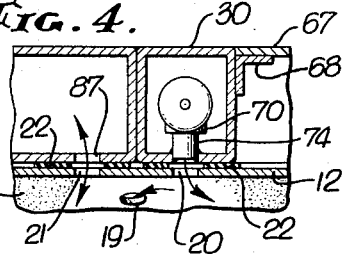
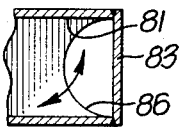

TRANSPORTER WITH BUILT-IN DISTRIBUTION AND DAMPING

This invention relates to air cushion devices and in particular, to an air cushion transporter comprising a new and improved platform and a plurality of replaceable air bearings for the platform.

A typical transporter with a platform and a plurality of replaceable air bearings is shown in the copending U.S. Pat. application of Robert E. Burdick entitled "Replaceable Air Cushion Device," Ser. 180,666 filed Sept. 15, 1971, now U.S. Pat. No. 3,756,342. Compressed air is delivered to the air bearings which generate a film of air between the transporter and the ground surface resulting in very low friction between the transporter and ground.

The platform must be structurally strong in order to support the heavy loads typically moved by an air cushion transporter. Also, air distribution piping for the various air bearings is required as part of the platform. Various configurations have been utilized in the past and the present invention is directed to a new and improved platform construction wherein the platform is formed of welded rectangular steel tubing of standard mill run shapes, with the welded tubes providing both the platform structural strength and the air distribution system. This construction results in a stronger and simpler platform with a low profile, while eliminating the air distribution piping and the problems of finding space for the piping. Other objects, advantages, features and results will more fully appear in the course of the following description.

In the drawing:

FIG. 1 is an end view of an air cushion transporter with a platform incorporating the presently preferred embodiment of the invention;

FIG. 2 is a sectional view taken along the line 2—2 of FIG. 1;

FIG. 3 is an enlarged partial sectional view taken along the line 3—3 of FIG. 2;

FIG. 4 is an enlarged partial sectional view taken along the line 4—4 of FIG. 2;

FIG. 5 is an enlarged partial sectional view taken along the line 5—5 of FIG. 2.

In the embodiment illustrated, the transporter comprises a platform 10 and four conventional replaceable air bearings 11. Each air bearing comprises an upper relatively rigid plate 12, typically of steel, and a lower flexible diaphragm 13, typically of rubber, with the diaphragm clamped to the plate at the periphery by a ring 14 and at the center by a disk 15 secured by rivets 16 to produce an annular space 17 between the diaphragm and plate and a central space 18 between the diaphragm and the ground surface 26. Openings 19 in the diaphragm 13 provide air flow paths between the annular space 17 and central space 18. Openings 20 and 21 in the plate 12 are aligned with openings in the platform when the bearing is inserted into the platform for air flow between the bearing and the platform. Gaskets 22 may be positioned on the plate 12 at the openings 20, 21.

Angles 23 are carried on the bottom of the platform with a pair of opposed angles defining a channel for slidingly receiving the plate 12 of an air bearing. Bars 24 are carried on the bottom of the platform for supporting the platform on the ground surface 26 when the air bearings are deflated or removed.

The platform 10 is formed of a plurality of pieces of rectangular steel tube welded together side by side, with one transverse tube and appropriate end plates. The platform is formed with standard mill run shapes requiring only cutting to appropriate length and providing openings for air passages in selected locations. A central portion of the platform is formed of tubes 30, 31, 32, 33, 34, 35 and 36 joined side by side. Another tube 40 is positioned transverse between the tubes 30, 36 with openings 41, 42 in the tubes 30, 36, respectively, providing a flow path between tubes 30, 40, and 36. A plate 44 closes one end of tubes 32, 33, 34 and another plate 45 closes the other end of tube 33. Another tube 46 is positioned between tubes 32, 34 with a closure plate 47, with tubes 32 and 34 and plates 45 and 47 defining a wheel space 50 in the platform adapted for receiving a guide wheel mechanism or a drive wheel mechanism (not shown). Space 50 may be closed by a bottom plate 51 and a top plate (not shown) carried on angles 52. A pipe 54 with a disconnect coupling 55 provides an air passage to the space 50 when an air operated wheel mechanism is utilized.

Air under pressure may be supplied to the transverse tube 40, via a valve 60 with a disconnect fitting for an external supply line 61, another fitting 62, and a pipe 63, with a pipe 63 fixed in an opening in the tube 40. The area with the pipes 54, 63 may be closed with a bottom plate 66 and a top plate 67 welded in place with reinforcing angle 68.

An orifice is provided at each end of the tubes 30, 36 for controlled air flow into the air bearings and in the embodiment illustrated, comprises a valve 70 positioned in a tube section 71 with a short length of pipe 72 welded in an end plate 73 at the tube 30, and another short length of pipe 74 welded in the bottom of the tube section 71 (FIG. 3). A handle 75 for manual adjustment orifice opening is accessible through the open end of the tube section 71. A similar construction is provided at the other end of the tube 30 and at each end of the tube 36.

The platform 10 also includes a damping chamber for each air bearing and in the embodiment illustrated, each damping chamber comprises tubes 80, 81, 82 welded together and to the tube 30 or 36, and closed with end of plates 83, 84. Cutouts 86 adjacent the ends of the tubes forming the camping chamber provide communication between the three tubes. Opening 87 in the bottom of the tube 82 provides communication with the air bearing there below.

In operation, the platform initially rests on the bars 24 and the uninflated air bearings are slid into position. Referring to the bearing in the lower left of FIG. 2, the bearing opening 20 is aligned with the orifice control valve 70 and the bearing opening 21 is aligned with the opening 87 of the damping chamber, as seen in FIGS. 3 and 4. The bearing in the upper right of FIG. 2 is similarly positioned. The bearing in the lower right of FIG. 2 and in the upper left of FIG. 2 has the bearing opening 21 aligned with the orifice valve 70 and the bearing opening 20 aligned with the damping chamber opening 87.

An air line is connected at the valve 60 and the valve is opened. Air under pressure flows into the transverse tube 40 and into the tubes 30, 36, and then to each of the air bearings through the corresponding orifice controlled valve 70. At each air bearing air flows into the annular space 17 and from there into the damping chamber and into the central space. The air flow inflates the diaphragm of the air bearing to the position shown in FIGS. 1 and 3, raising the platform off of the support bars 24. Air flows from the central space 18 outward between the diaphragm and the ground surface providing a thin film of air on which the transporter rests. The transporter is now ready for movement along the surface with the very low friction resulting from the air flow.

When the transporter is moved to the desired position, the air supply is shut off, the air bearings are deflated and the platform moves downward to rest on the bars 24.

The orifice control valves 70 provide a control for the orifice at the inlet of each air bearing for controlling the air flow to the bearing. In an alternative configuration, the valve may be omitted, with the end of the tube section 71 closed and with the opening in the bottom of the tube communicating with the air bearing made of a predetermined size to function as the orfice.

The platform of the invention provides a low profile transporter with no air distribution piping other than the inlet pipes and with a smooth top and sides, with all of the necessary air lines being provided by the tubes which also provide the mechanical support structure of the platform.

I claim:

1. An air cushion transporter with a platform and at least 4 air bearings,
    said platform comprising a plurality of rectangular metal tubes joined side by side, and means carried on said tubes for slidingly receiving said air bearings, said plurality of tubes including
    a first tube extending between first and third bearing zones and a second tube parallel to said first tube and extending between second and fourth bearing zones,
    a third tube positioned between and attached to said first and second tubes, with openings in the walls of said first and second tubes at said third tube providing an air flow path between said first, second and third tubes,
    a first closed chamber at said first bearing zone and including a fourth tube alongside said first tube an having a first downwardly facing opening for communication with a corresponding opening in an air bearing, said first tube including means defining an orifice with a second downwardly facing opening for communication with a corresponding opening in an air bearing,
    corresponding second, third and fourth closed chambers at said second, third and fourth bearing zones, respectively, and
    pipe means for connecting an air supply to said third tube.

2. A transporter as defined in claim 1 wherein said orifice defining means of said first tube comprises a valve carried in a tube section at one end of said first tube providing a right angle flow path from said first tube to said second opening, with a manually actualable valve control at the open end of said tube section for controlling the size of said orifice.

3. A transporter as defined in claim 2 wherein each of said closed chambers includes at least one additional tube adjacent the fourth tube with means defining flow paths there between.

4. A transporter as defined in claim 3 with said closed chambers on the outer sides of said first and second tubes,
    and fifth and sixth tubes spaced from each other between said first and second tubes, with said third tube closing one end of said fifth and sixth tubes, with the other ends thereof open at the edge of the platform.

5. A transporter as defined in claim 4 including means defining a wheel receiving space between said fifth and sixth tubes, and
    additional pipe means for connecting an air supply to said space.

* * * * *